United States Patent Office 2,831,857
Patented Apr. 22, 1958

2,831,857

8,9-OXIDO-3,7,11-OXYGENATED STEROIDS

Leopold Ruzicka, Hans Heusser, and Oskar Jeger, Zurich, Switzerland, assignors to Ciba Pharmaceutical Products, Inc., Summit, N. J.

No Drawing. Application December 13, 1951
Serial No. 261,584

Claims priority, application Switzerland December 22, 1950

4 Claims. (Cl. 260—239.55)

The present invention is concerned with a new process leading to new compounds which make it possible to synthesize therapeutically active steroids containing oxygen in the 11-position.

The steroids with oxygen in 11-position are of great importance. An important representative of this class of compounds is for example cortisone, $\Delta^4$-3,11,20-trioxo-17$\alpha$,21-dihydroxy-pregnene. The hitherto known processes for the synthetic production of such steroids use as starting materials desoxycholic acid and its derivatives, that is to say compounds which possess a hydroxyl group in 12-position. It has been shown however that the transfer of oxygen from the 12- to the 11-position is a very tedious process requiring several operations. In addition the desoxycholic acid used as starting material is only obtainable in relatively limited quantity, so that for example it is practically impossible to manufacture the cortisone required in therapy in sufficient quantity by this method. A requirement therefore exists for new sources for the manufacture of this medicament. The easily available sterols, such as ergosterol, stigmasterol or sitosterol, but more especially cholesterol, have indeed for many years been important starting materials for the production of sex hormones. They have however hitherto been without importance for the production of compounds with oxygen in the 11-position of the intact steroid structure.

The present invention is based on the observation that by starting from the above-mentioned sterols or conversion products thereof, compounds of the steroid series with oxygen in the 11-position can be obtained when a $\Delta^{7,8;9,11}$-steroid is treated with an agent capable of introducing oxygen, the resultant $\Delta^{7,8}$-9,11-oxido compound is isomerized, an oxidizing agent is caused to act on the $\Delta^{8,9}$-7,11-dihydroxy-compound formed, the resultant 8,9-oxido-steroid is treated with a hydrogenating agent and the oxo-group in 7-position of a resultant $\Delta^{8,9}$-7-oxo-11-hydroxy compound is removed by reduction.

The process is illustrated by the following diagram of partial formulae:

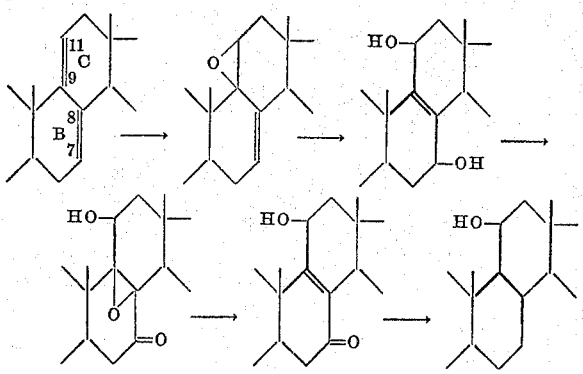

An object of the present invention are 8,9-oxido-7,11-dihydroxy-steroids and 8,9 - oxido - 7 - oxo-11-hydroxy-steroids. These compounds are new and are intended for use as intermediate products for the preparation of 11-hydroxy-steroids. Another object of the invention is a process for the manufacture of 8,9-oxido-7,11-dihydroxy-steroids and 8,9-oxido-7-oxo-11-hydroxy-steroids. It comprises the reaction of a $\Delta^{8,9}$-7,11-dihydroxy-steroid with chromic acid or monoperphthalic acid under mild conditions.

These $\Delta^{8,9}$-7,11-dihydroxy-steroids belong to the cyclopentanopolyhydrophenanthrene or the polyhydrochrysene series. Particular importance is attached to the derivatives of cholestane, coprostane, sitostane, stigmastane, cholane, allocholane, pregnane, androstane and etiocholane. In addition to the aforementioned double bond, the starting materials may have other double bonds. Where any double bonds are reactive these are suitably protected before the oxidation step of the process, for example by attachment of halogen or hydrogen halide. For the protection of the 5,6-double bond, $\Delta^{5,6}$-steroids may be converted into i-steroids. They can be obtained, e. g. by isomerizing a $\Delta^{7,8}$-9,11-oxido-steroid with an acid according to copending U. S. patent application Serial No. 261,578, filed December 13, 1951 (now U. S. Patent No. 2,768,188, patented October 23, 1956).

The oxidation with chormic acid or monoperphthalic acid is carried out under mild conditions, e. g. at about 20° C. or 0° C., respectively, in the presence of a diluent, such as an organic solvent, as benzane or glacial acetic acid or dioxane.

The following examples illustrate the invention, the relation between parts by weight and parts by volume being the same as that between the gram and the cubic centimeter:

*Example 1*

5 parts by weight of $\Delta^{8,9;22,23}$-3$\beta$-acetoxy-7,11-dihydroxy-stigmastadiene, prepared according to U. S. patent application Serial No. 261,578, filed December 13, 1951, are suspended in 300 parts by volume of glacial acetic acid. There are then added while cooling with ice 33 parts by volume of a solution of glacial acetic acid and chromic acid containing per part by volume 0.01 part by weight of active oxygen. The reaction mixture is allowed to stand at 0° C. for a short while and then at room temperature for 5 hours. At the end of this time, the substance is in solution. Water and methanol are added. After about 2 hours the oxidation product is taken up in ether and the ethereal solution is washed with dilute, ice-cold sodium carbonate solution and then with water. In this manner there are obtained 4.8 parts by weight of a neutral oxidation product which is purified by chromatography on aluminum oxide. The first eluates of the chromatogram yield the $\Delta^{8,9;22,23}$-3$\beta$-acetoxy-7,11-dioxo-stigmastadiene ($\lambda$max. in alcohol=273 m$\mu$; log $\epsilon$=3.93)

and the $\Delta^{22,23}$ - 3$\beta$ - acetoxy-7-oxo-8,9-oxido-11-hydroxy-stigmastene, the latter showing but an end absorption in the ultraviolet spectrum. The last fractions of the chromatogram yield 1.5 parts by weight of $\Delta^{22;23}$-3$\beta$-acetoxy-8,9-oxido-7,11-dihydroxy-stigmastene.

In an analogous manner there are obtained from the $\Delta^{8,9}$-3$\beta$-acetoxy-7,11-dihydroxy-cholestene, the 3$\beta$-acetoxy-8,9-oxido-7,11-dhydroxy-cholestane and 3$\beta$-acetoxy-8,9-oxido-7-oxo-11-hydroxy-cholestane.

*Example 2*

2.5 parts by weight of finely powdered $\Delta^{8,9;22,23}$-3$\beta$-acetoxy-7,11-dihydroxy-ergostadiene, prepared according to U. S. patent application Serial No. 261,578, filed December 13, 1951, are admixed, while cooling with ice, with 200 parts by volume of glacial acetic acid. To this suspension there are added, while cooling further, 16.08 parts by volume of a solution of glacial acetic acid and chromic acid containing 0.0106 part by weight of active oxygen per part by volume. The reaction mixture is left standing at 0° C. for 15 minutes and then at 20° C. for 4 hours. At the end of this time, the oxidizing agent is consumed and all of the substance is in solution. The reaction mixture is worked up as described in Example 1 and the crude product is split up by fractionating crystallization or better yet by chromatography on aluminum oxide. The first eluates of the chromatogram yield 0.6 part by weight of $\Delta^{8,9;22,23}$-3$\beta$-acetoxy-7,11-dioxo-ergostadiene of melting point 132–135° C. The later fractions yield the $\Delta^{22,23}$-3$\beta$-acetoxy-8,9-oxido-7-oxo-11-hydroxy-ergostene which melts at 152-154° C. The last fractions, finally, yield on recrystallization from a mixture of methanol and water 0.7 part by weight of $\Delta^{22,23}$-3$\beta$-acetoxy-8,9-oxido-7,11-dihydroxy-ergostene which melts at 145–147° C.

*Example 3*

1.5 parts by weight of $\Delta^{8,9;22,23}$-3$\beta$-acetoxy-7,11-dihydroxy-ergostadiene prepared according to U. S. patent application Serial No. 261,578, filed December 13, 1951, are dissolved in 300 parts by volume of dioxane and after cooling to about 0° C. there are added 15 parts by volume of an ethereal solution of monoperphthalic acid containing 0.007 part by weight of active oxygen per part by volume. The solution is left standing at 0° C. for 24 hours and then at 20° C. for 5 days. The reaction solution is then washed with an aqueous solution of sodium bicarbonate and water, dried and evaporated. On recrystallizing from a mixture of methanol and water, the crude product yields $\Delta^{22,23}$-3$\beta$-acetoxy-8,9-oxido-7,11-dihydroxy-ergostadiene of melting point 145–147° C.

When the $\Delta^{8,9}$-3$\beta$,20-diacetoxy-7,11-dihydroxy-pregnene is oxidized in exactly the same manner with monoperphthalic acid and worked up there is obtained the 3$\beta$,20-diacetoxy-8,9-oxido-7,11-dihydroxy-pregnane.

*Example 4*

2.5 parts by weight of finely powdered $\Delta^{8,9}$-3$\beta$,17$\beta$-diacetoxy-7,11-dihydroxy-androstene, prepared according to U. S. patent application Serial No. 261,578, filed December 13, 1951, are admixed, while cooling with ice, with 200 parts by volume of glacial acetic acid. To the suspension are added at about 0° C. 16 parts by volume of a mixture of glacial acetic acid and chromic acid containing per part by volume 0.0106 part by weight of active oxygen. The reaction mixture is kept at 0° C. for 15 minutes and then at 20° C. for 4 hours after which time all of the substance is in solution. The reaction mixture is worked up in the manner indicated in Example 1 and separated. In addition to the $\Delta^{8,9}$-3$\beta$,17$\beta$-diacetoxy-7,11-dioxo-androstene and the 3$\beta$,17$\beta$-diacetoxy-8,9-oxido-7-oxo-11-hydroxy-androstane there is obtained the 3$\beta$,17$\beta$-diacetoxy-8,9-oxido-7,11-dihydroxy-androstane. The latter compound can also be obtained by oxidizing the $\Delta^{8,9}$-3$\beta$,17$\beta$-diacetoxy-7,11-dihydroxy-androstene by means of monoperphthalic acid according to Example 3.

What is claimed is:

1. Process for the preparation of a member selected from the group consisting of 8,9-oxido-7,11-dihydroxy-steriods and 8,9-oxido-7-oxo-11-hydroxy-steriods, which comprises treating a member selected from the group consisting of $\Delta^{8,9}$-7,11-dihydroxy-stigmastenes, $\Delta^{8,9}$-7,11-dihydroxy-cholestenes, $\Delta^{8,9}$-7,11-dihydroxy-ergostenes, $\Delta^{8,9}$-7,11-dihydroxy-pregnenes and $\Delta^{8,9}$-7,11-dihydroxy-androstenes under mild conditions with a member selected from the group of chromic acid and monoperphthalic acid.

2. A member selected from the group consisting of 3-oxygenated 8,9-oxido-7,11-dihydroxy- and 3-oxygenated 8,9-oxido-7-oxo-11-hydroxy-stigmastanes, chloestanes, ergostanes, pregnanes and androstanes.

3. The $\Delta^{22,23}$-8,9-oxido-7,11-dihydroxy-3$\beta$-acetoxy-ergostene.

4. The $\Delta^{22,23}$-8,9-oxido-7-oxo-11-hydroxy-3$\beta$-acetoxy-stigmastene.

References Cited in the file of this patent

UNITED STATES PATENTS 2,312,344   Logemann _____ Mar. 2, 1943

OTHER REFERENCES

Fieser et al.: Natural Products Related to Phenanthrene, 3rd. ed., page 425 (1949).

Heusser: Helv. Chim. Acta 34, 2106–2132 (1951).